(12) United States Patent
Chambers et al.

(10) Patent No.: US 10,104,029 B1
(45) Date of Patent: Oct. 16, 2018

(54) EMAIL SECURITY ARCHITECTURE

(71) Applicants: Charles Wade Chambers, Sunnyvale, CA (US); Martin Traverso, Menlo Park, CA (US); Dain Sidney Sundstrom, Palo Alto, CA (US); David Andrew Phillips, Sunnyvale, CA (US); David Eric Hagar, Mountain View, CA (US); Mark Erol Kent, Mountain View, CA (US)

(72) Inventors: Charles Wade Chambers, Sunnyvale, CA (US); Martin Traverso, Menlo Park, CA (US); Dain Sidney Sundstrom, Palo Alto, CA (US); David Andrew Phillips, Sunnyvale, CA (US); David Eric Hagar, Mountain View, CA (US); Mark Erol Kent, Mountain View, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 16 days.

(21) Appl. No.: 13/673,286

(22) Filed: Nov. 9, 2012

Related U.S. Application Data (60) Provisional application No. 61/557,728, filed on Nov. 9, 2011.

(51) Int. Cl.
*G06F 15/16* (2006.01)
*H04L 12/58* (2006.01)

(52) U.S. Cl.
CPC ................................. *H04L 51/12* (2013.01)

(58) Field of Classification Search
CPC ... H04L 63/1408; H04L 12/585; H04L 51/12; H04L 51/32; G06Q 10/107; G06Q 10/10; G06F 21/00

USPC .......................................................... 709/206
See application file for complete search history.

(56) References Cited

U.S. PATENT DOCUMENTS

| | | | |
|---|---|---|---|
| 7,548,956 B1* | 6/2009 | Aoki et al. ..................... 709/207 |
| 7,716,297 B1* | 5/2010 | Wittel et al. .................. 709/206 |
| 8,392,357 B1* | 3/2013 | Zou et al. ...................... 707/602 |
| 2002/0199095 A1* | 12/2002 | Bandini et al. ............... 713/151 |
| 2006/0026242 A1* | 2/2006 | Kuhlmann et al. ........... 709/206 |
| 2006/0059238 A1* | 3/2006 | Slater ................... G06Q 10/107 709/206 |
| 2006/0168041 A1* | 7/2006 | Mishra et al. ................ 709/206 |
| 2007/0107059 A1* | 5/2007 | Chasin .................. H04L 63/126 726/23 |

(Continued)

OTHER PUBLICATIONS

Graham, Paul. "A Plan for Spam." Aug. 2002, <http://www.paulgraham.com/spam.html>. pp. 1-12.*

(Continued)

*Primary Examiner* — Christopher Biagini
(74) *Attorney, Agent, or Firm* — Carr & Ferrell LLP (57) ABSTRACT

A method for filtering unsolicited emails may comprise dynamically aggregating historical email data associated with a user or a group of users and dynamically determining one or more trusted trends criteria associated with the historical email data. The method may further comprise receiving a new email addressed to the user or the group of users, calculating a score associated with the new email based on the one or more trusted trends criteria, determining that the score is above a predetermined threshold score, and, based on the determination, selectively filtering the new email.

29 Claims, 8 Drawing Sheets

(56) References Cited

U.S. PATENT DOCUMENTS

| | | | | |
|---|---|---|---|---|
| 2008/0140781 A1* | 6/2008 | Bocharov | ............ | G06Q 10/107 709/206 |
| 2008/0256187 A1* | 10/2008 | Kay | .............................. | 709/206 |
| 2010/0185739 A1* | 7/2010 | Shuster | .......................... | 709/206 |
| 2013/0325991 A1 | 12/2013 | Chambers et al. | | |

OTHER PUBLICATIONS

Andrew Kalafut, Craig Shue, and Minaxi Gupta, "Malicious Hubs: Detecting Abnormally Malicious Autonomous Systems", IEEE International Conference on Computer Communications (INFOCOM) Mini-Conference, Mar. 2010.*

* cited by examiner

EMAIL SECURITY ARCHITECTURE

CROSS REFERENCES TO RELATED APPLICATIONS

This non-provisional patent application claims the benefit of U.S. provisional patent application No. 61/557,728, filed on Nov. 9, 2011, which is hereby incorporated by reference in its entirety.

TECHNICAL FIELD

This disclosure relates generally to electronic mail and, more particularly, to the technology for filtering unsolicited electronic mail messages by assessing historical mail trends and behaviors.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Electronic mail messages, hereinafter "email", are now widely used to exchange messages between users or computing systems. The email can be transmitted over the Internet or other communications networks and has grown increasingly popular due to, among other things, its speed, efficiency, and low cost. However, these very qualities have made the email particularly susceptible to abuse by advertisers and others trying to reach large "audiences" without having to incur the costs of postage and paper handling associated with the regular, so called "snail", mail. Thus, email users face a growing problem in which their email addresses and identities may be collected in various databases which are used (or sold to third parties) to generate unwanted mail. This problem results in email users receiving increasing quantities of unwanted and unsolicited emails, which are also known as "spam", "junk", or "malicious" emails. The growing number of such emails requires email users to spend significant time searching for legitimate communications. In some cases, email users feel that the only solution to this problem is changing email addresses, but this is only a temporary measure until spam emails resume which also makes it difficult for legitimate mail to find its addressees.

Furthermore, malicious emails may often lead to significant damage to computing systems and data and property loss due to spread of computer viruses and malware. For example, an email "phishing" technique may be used to acquire information including usernames, passwords, credit card details, and other sensitive data by email. Such phishing emails may contain links to websites infected with malware.

As a result, the increasing number of unsolicited emails is a major problem for email users, service providers, companies, and other involved parties. There exist various approaches for filtering and blocking unwanted emails. For example, in one approach, an email user who is the recipient of unwanted emails can reconfigure his email client, email transfer agent, or webmail service to filter emails from offending email addresses. While this approach may work against specific spammers, it requires that the email user take action every time a new spammer is identified.

Another approach utilizes various software tools which attempt to eliminate spam emails automatically. Typically, these software tools will examine incoming email messages and search for indications of spam. For example, an incoming email may be classified as spam if a large number of messages have been sent from the same sender, the email contains a suspicious attachment, a suspicious combination of words, or the Internet Protocol (IP) address associated with the sender is blacklisted. Once such emails classified as spam, they may be either automatically deleted by the software tools or placed in a "quarantine" zone. This approach may be effective against some spam.

However, despite various measures, the number of sophisticated and targeted email attacks has been increasing significantly in part because spam emails are now more targeted towards specific recipients and take various countermeasures to circumvent conventional filtering techniques. Conventional security architectures are not keeping pace with evolving malicious emails attacks.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure refers to the technology for filtering unsolicited emails such as spam emails, phishing emails, malicious emails, and so forth. In general, the present technology is directed to finding abnormalities in otherwise legitimate emails. This approach differs from existing solutions that analyze emails that are classified as suspicious in order to block their future delivery. Thus, in contrast to the existing solutions, the present disclosure provides a proactive approach in detecting abnormal, spam, and malicious emails.

According to one or more embodiments of the present disclosure, there is provided a method for filtering unsolicited emails. An example method may comprise dynamically aggregating historical email data, which may include emails associated with a user. The method may further comprise dynamically determining one or more trusted trends criteria associated with the historical email data. The method may further comprise receiving a new email addressed to the user or a group of users. The method may further comprise calculating a score associated with the new email based on the one or more trusted trends criteria. The method may further comprise determining that the score is above a predetermined threshold score. The method may further comprise selectively filtering, based on the determination, the new email.

According to certain embodiments, the one or more trusted trends criteria include one or more attributes associated with the historical email data. In an example embodiment, the one or more attributes include one or more user side attributes. For example, the one or more user side attributes may include one or more of the following: a number of emails by size, a number of emails by time of day, a number of recipients per email, a number of emails per mail user agent, a number of emails by language, a number of emails by character set, a number of emails by a number of attachments, a number of emails by content type, a number of emails having a header and a number of emails lacking a header, a receive to send ratio by address, a number of emails received by address, a number of emails sent to by address, and a percentage of unsolicited emails received.

In another example embodiment, the one or more attributes include one or more infrastructure attributes, which in turn may include one or more of the following: a number of Internet Protocol (IP) addresses in an Autonomous System Number (ASN), email volume per IP, a number of domains per the ASN, a number of emails by size, a number of sent and received emails per time of day, and a number of recipients per email.

In yet another example embodiment, the one or more attributes may include one or more company attributes, which in turn may include one or more of the following: a number of IP addresses in the ASN, a number of sending Top-Level Domains (TLDs), a number of sent and received emails per time of day, a number of emails received per domain, and a number of emails received per sender.

In yet another example embodiment, the one or more attributes may include one or more email attributes, which in turn may include one or more of the following: a number of headers per email, a number of recipients, a number of emails per language, a number of emails by character set, a number of emails by country, a number of emails by number of attachments, and a number of emails by content type.

In yet another example embodiment, the one or more attributes may include one or more trending attributes, which in turn may include one or more of the following: a number of emails by an IP address, a number of emails to a target by an IP address, and a number of Uniform Resource Locators (URLs) per email.

In certain embodiments, the calculation of the score associated with the new email may include analyzing content and metadata associated with the new email. In certain embodiments, the method may further comprise training one or more heuristic algorithms by dynamically updating the one or more trusted trends criteria associated with the historical email data. In certain embodiments, the method may further comprise marking the new email as a suspicious email based on the determination that the score is above the predetermined threshold score. In certain embodiments, the method may further comprise replacing an URL associated with the new email with a safe URL. In certain embodiments, the method may further comprise redirecting the new email to a sandbox. In certain embodiments, the calculating of the score associated with the new email may comprise matching attributes of the new email to one or more patterns associated with the one or more trusted trends criteria.

In further example embodiments, method steps may be stored on a machine-readable medium comprising instructions, which when implemented by one or more processors implement the above example methods. In yet further example embodiments, hardware systems or devices can be adapted to implement the above methods. Other features, examples, and embodiments are described below.

BRIEF DESCRIPTION OF THE DRAWINGS

Embodiments are illustrated by way of example, and not by limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should also be noted that methods disclosed herein can be implemented by a computer (e.g., a desktop computer, tablet computer, laptop computer), game console, handheld gaming device, cellular phone, smart phone, smart television system, and so forth.

In general, the embodiments of the present disclosure pertain to methods for selective filtering of unsolicited emails such as unwanted emails, advertisement emails, spam emails, emails containing malicious content or attachments, and so forth. While conventional technologies for filtering unsolicited emails are mostly directed to understanding unsolicited emails to prevent their receipt in the future, the present technology is directed to analyzing otherwise legitimate emails to understand normal trends and behaviors. Criteria associated with historical trends and behaviors can be used to classify emails and identify those outside of such historical trends. This proactive technique may use various heuristic algorithms and provide faster and more reliable methods for filtering unsolicited emails compared to the conventional filtering techniques.

More specifically, the present technology involves aggregation of historical email data associated with a particular email user or a group of email users pertaining to a particular organization, as an example. The historical email data may be aggregated and analyzed dynamically, for example, every time a new email is received. Based on such analysis, at least one trusted trend may be determined. The trusted trends may include a number of various criteria having certain attributes. The attributes may include user side attributes, infrastructure attributes, company attributes, email attributes, and trending attributes. Particular examples of these attributes will be provided in greater detail below. The attributes may be monitored using various machine learning algorithms, heuristic algorithms, or neural network algorithms, which can be trained every time a new email is received or sent. Basically, these algorithms may be trained to understand what "normal" behaviors and trends of email user activity are so that every new email may be assessed based on known "normal" patterns. If a new email is outside of such patterns, it may be considered suspicious and certain defensive actions may be taken with respect to the new email. More specifically, when the new email is received, a score may be calculated based on the trusted trends criteria. Thereafter, it may be determined whether this score is above (or below) a predetermined threshold score. If the score is above the predetermined threshold score, the new email can be filtered, for example, deleted, placed into a quarantine zone, marked as "suspicious", "spam", "junk" email, or redirected to a sandbox. These principles will be now described in greater detail by referring to the accompanying drawings.

Figure 1:
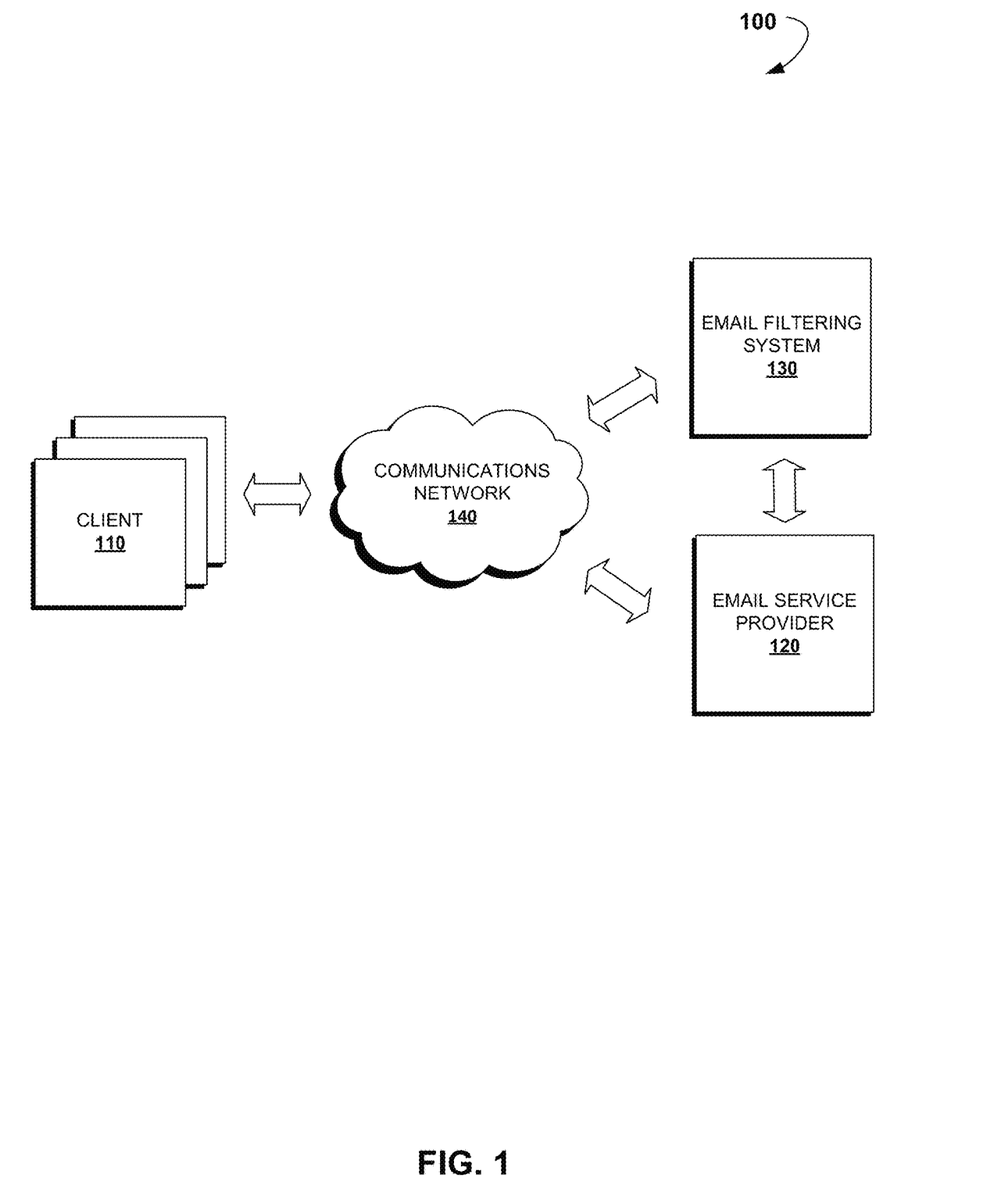
FIG. 1 shows a high-level block diagram of an example system environment suitable for implementing the present technologies for filtering unsolicited emails.

FIG. 1 shows a high-level block diagram of an example system environment 100 suitable for practicing the present technologies for filtering unsolicited emails. The system environment 100 may include one or more clients 110, an email service provider 120, an email filtering system 130, and a communications network 140.

According to various embodiments, the clients 110 include various clients in "client-server environments". In other words, the clients 110 may include computers operated by email users. The computers may include desktop computers, laptop computers, tablet computers, smart phones, wireless telephones, gaming consoles, television systems, and other electronic devices having networked connectivity and able to receive or send emails over the communication network 140. The clients 110 may include email agents (also known as email clients, email readers, and mail user agents) installed thereon for accessing and managing user's emails.

The email service provider 120 may include software which enables email servers to send, receive, and store emails associated with organizations and/or individual users. The email service provider 120 may provide web mail services to the public in general for personal use (e.g., Hotmail® or Gmail®) or provide services exclusively to its members, subscribers, employees, professional organizations, and so forth. The email service provider 120 may be a part of a large organization whose primary function is not providing web email services but providing other services such as network connectivity. For example, an Internet Service Provider (ISP) may be mainly concerned with providing Internet access to users but provide email services as a convenience. Users may typically access their email via webmail, POP3 or IMAP protocols depending on the architecture and policies of the email service provider 120.

The email filtering system 130 may be configured to implement algorithms for filtering unsolicited emails according to the example methods described herein. As shown in FIG. 1, the email filtering system 130 may be implemented as a web (e.g., cloud-based) service running on one or more stand alone servers such that it may track and control email flow from and to the clients 110.

The communications network 140 may include a wireless or wire network, or a combination thereof. For example, the network may include one or more of the following: the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, dial-up port such as a V.90, V.34 or V.34 bis analog modem connection, cable modem, ATM (Asynchronous Transfer Mode) connection, or an FDDI (Fiber Distributed Data Interface) or CDDI (Copper Distributed Data Interface) connection. Furthermore, the communications may also include links to any of a variety of wireless networks including, WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fiber Channel connection, IrDA (infrared) port, SCSI (Small Computer Systems Interface) connection, USB (Universal Serial Bus) connection, or other wired or wireless, digital or analog interface or connection, mesh or Digi® networking.

Figure 2:
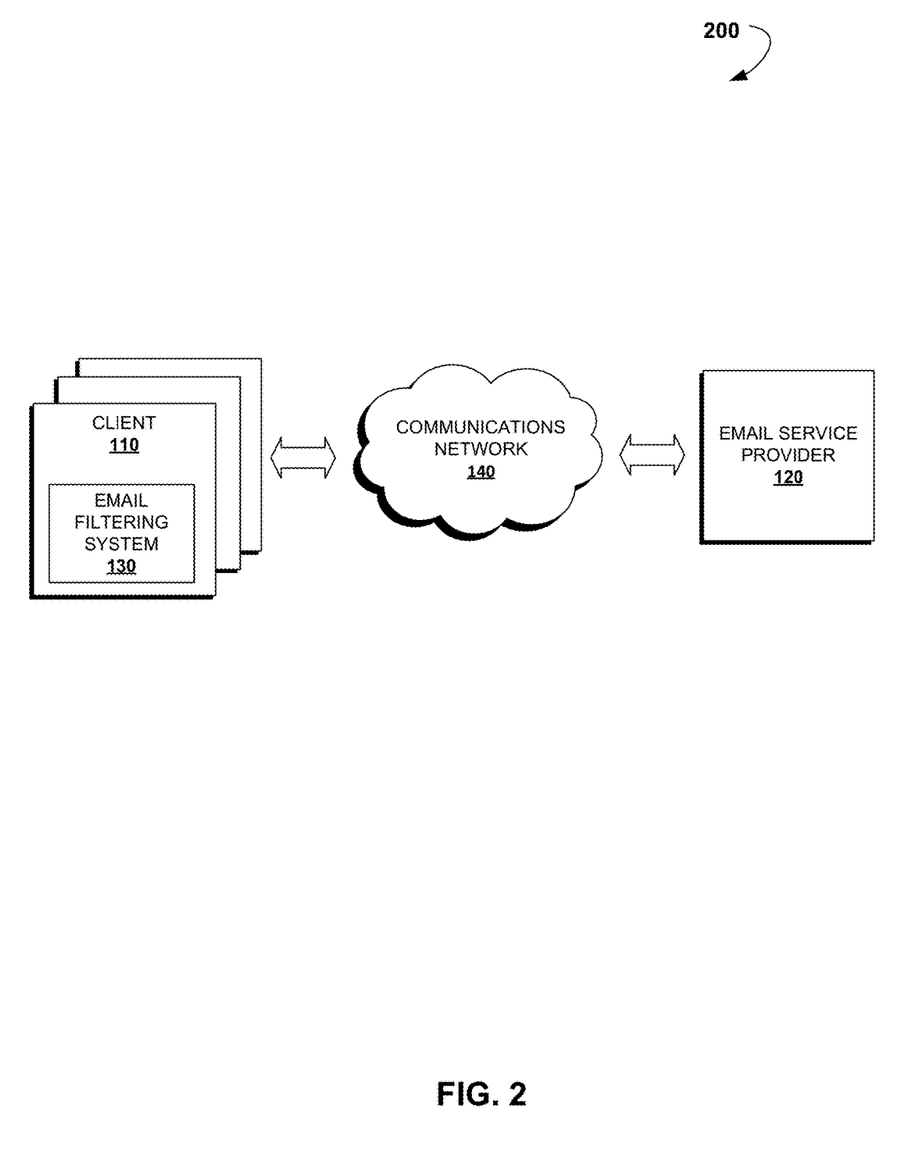
FIG. 2 shows a high-level block diagram of another example system environment suitable for practicing the present technologies.

FIG. 2 shows a high-level block diagram of another example system environment 200 suitable for practicing the present technologies for filtering unsolicited emails. In particular, in this embodiment, the email filtering system 130 is implemented as a software application being a part of mail agents installed on the clients 110. Alternatively, the email filtering system 130 may refer to a stand alone software application working in cooperation with the mail agents installed on the clients 110.

Figure 3:
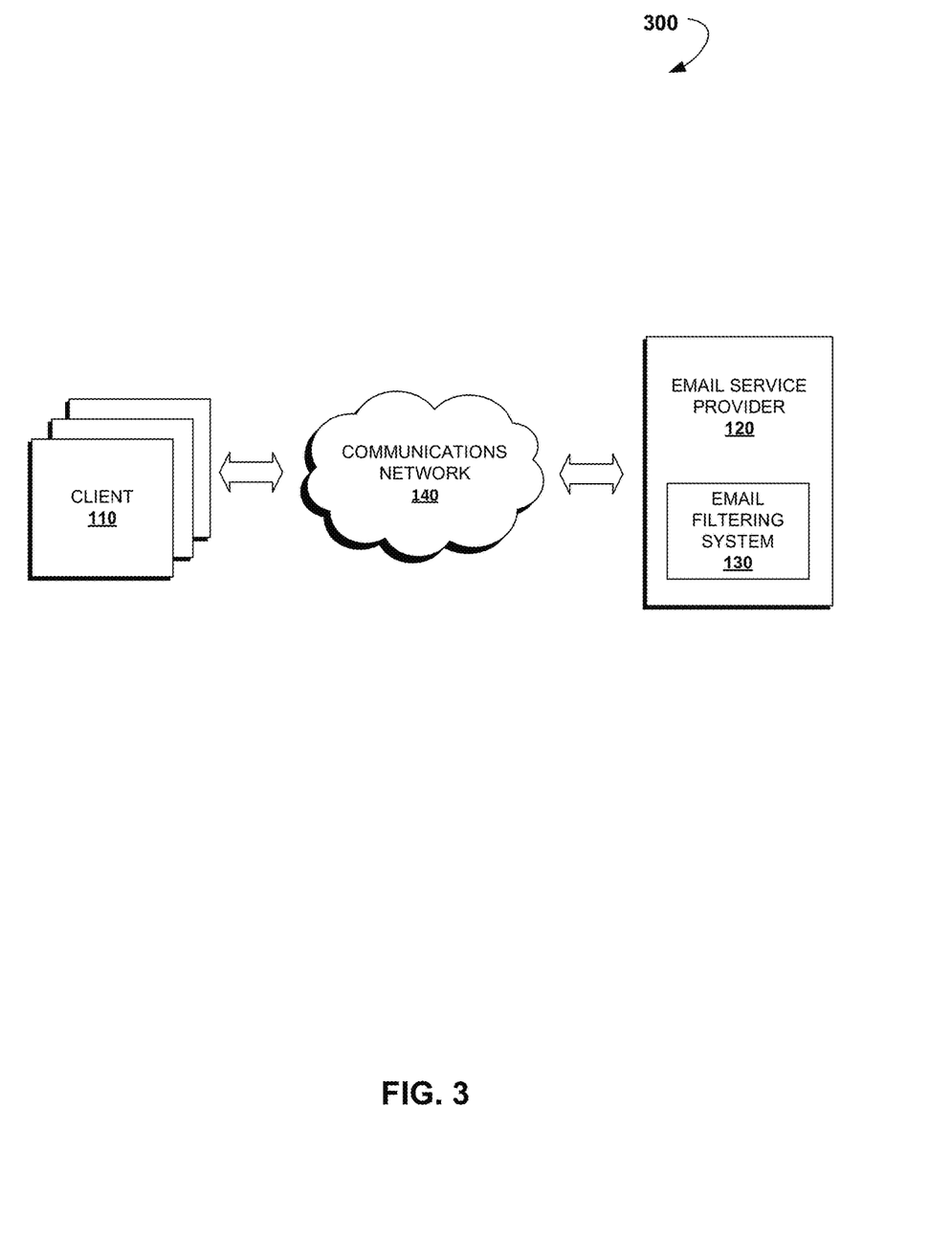
FIG. 3 shows a high-level block diagram of yet another example system environment suitable for practicing the present technologies.

FIG. 3 shows a high-level block diagram of yet another example of system environment 300 suitable for practicing the present technologies for filtering unsolicited emails. In particular, in this embodiment, the email filtering system 130 is implemented as a software application integrated into the email service provider 120 or software application being a part of the email service provider 120.

Figure 4:
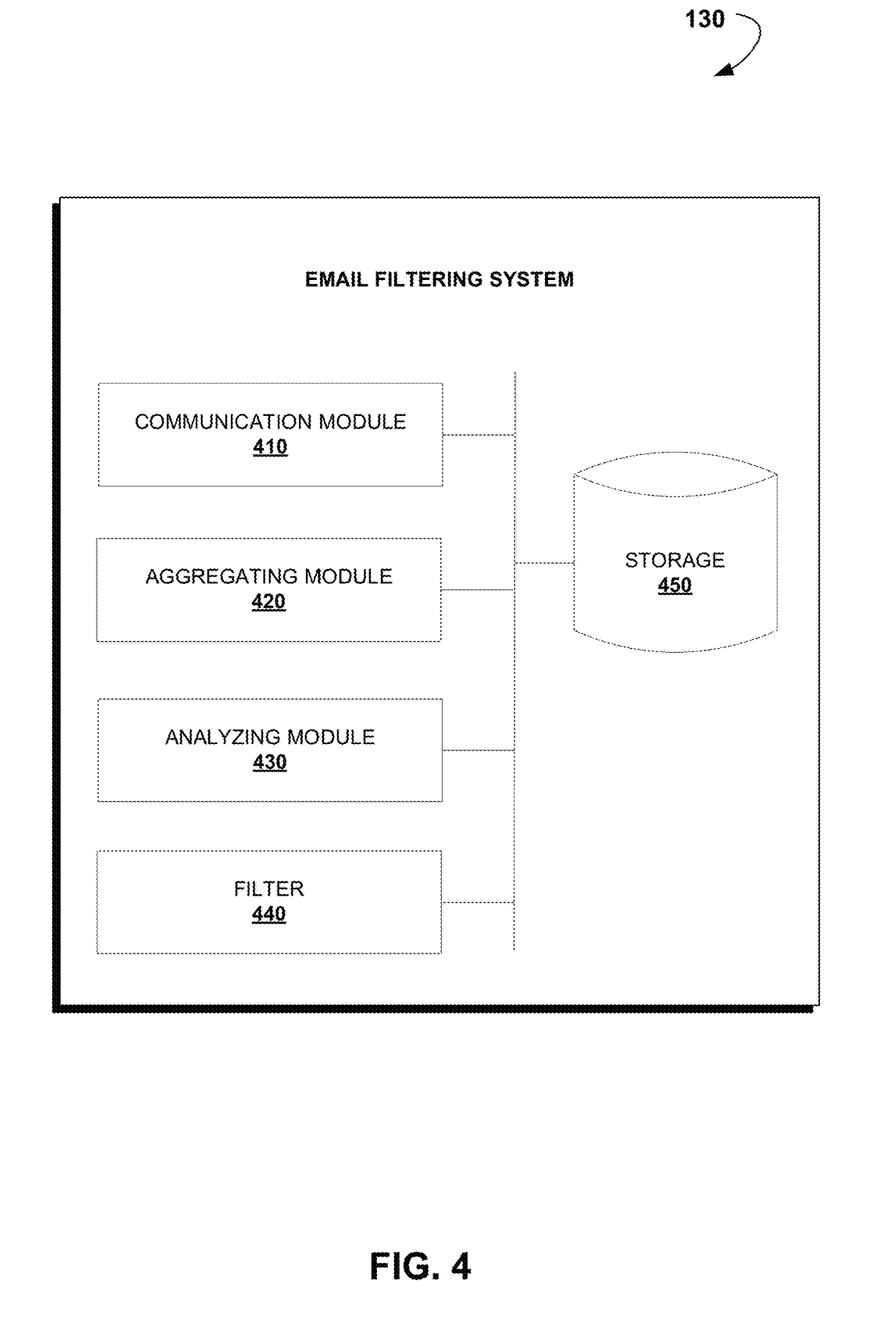
FIG. 4 shows an example high-level block diagram of an email filtering system, according to an example embodiment.

In either case, the email filtering system 130 may perform the methods directed to email filtering described herein with respect to various embodiments. FIG. 4 shows an example high-level block diagram of the email filtering system 130. As shown in the figure, the email filtering system 130 may include a communication module 410, an aggregating module 420, an analyzing module 430, a filter 440, and a storage 450. It should be mentioned that the above modules may be realized as software or virtual components, hardware components, or a combination of thereof.

According to one or more embodiments, the communication module 410 may be configured to send electronic messages over the communications network 140 toward the email service provider 120 and/or the clients 110, or receive messages from these addressees. For example, every new email assigned for a particular user received by the email service provider 120 may be, at first, sent to the email filtering system 130, which then determines whether the new email is an unsolicited email, and if yes, the new email can be redirected back to the email service provider 120 or the email service provider 120 may be notified otherwise. In other words, the email filtering system 130 may determine that the new email is an unsolicited and/or malicious email and, therefore, to be filtered or blocked. In such case, the email filtering system 130 may inform the email service provider 120 that the new email was deleted, filtered, blocked, placed into a sandbox or inform the email service provider 120 that a suspicious URL was replaced with a safe URL, and so forth. The communication module 410 may be also configured to provide communication among the remaining modules and units of the email filtering system 130.

According to one or more embodiments, the aggregating module 420 may be configured to dynamically aggregate historical email data associated with one or more users. The historical email data may include emails received sent by the one or more users. The historical email data may be updated regularly, e.g., every time when a new email is received or sent out.

In one embodiment, the aggregating module 420 may aggregate only specific parameters of the received and sent emails. For example, it may aggregate only metadata associated with the email, including, for example, a sender address, a sender name, a recipient address, a recipient name, a time and a date of communication, a route, a content type, a size, a number and parameters of attachments, a number of sender addresses, a number of recipient addresses, and so forth. The aggregated information which may include the entire emails or store specific parameters of the emails in the storage 450.

According to one or more embodiments, the analyzing module 430 may be configured to analyze the historical email data aggregated by the aggregating module 420. The analysis of the historical email data may be utilized to provide one or more trusted trends criteria. In general, the trusted trends criteria may include patterns associated with "normal" and "trusted" email activity behaviors associated with a particular user or a group of users. The trusted trends criteria may include one or more attributes associated with the historical email data. These attributes may include user side attributes, infrastructure attributes, company attributes, email attributes, trending attributes, and so forth. Generally speaking, these attributes may reflect features or characteristics of aggregated historical email data. For example, these attributes may include the following attributes:

(1) User Side Attributes:
a number of emails by size,
a number of emails by time of day,
a number of recipients per email,
a number of emails per mail user agent,
a number of emails by language,
a number of emails by character set,
a number of emails by number of attachments,
a number of emails by content type,
a number of emails having a header and a number of emails lacking a header,
a receive to send ratio by address,
a number of emails received by address,
a number of emails sent to by address,
a percentage of unsolicited emails received, etc.
(2) Infrastructure Attributes:
a number of IP addresses in an ASN,
an email volume per IP,
a number of domains per the ASN,
a number of emails by size,
a number of sent and received emails per time of day,
a number of recipients per email, etc.
(3) Company Attributes:
a number of IP addresses in the ASN,
a number of sending TLDs,
a number of sent and received emails per time of day,
a number of emails received per domain,
a number of emails received per sender, etc.
(4) Email Attributes:
a number of headers per email,
a number of recipients,
a number of emails per language,
a number of emails by character set,
a number of emails by country,
a number of emails by number of attachments,
a number of emails by content type, etc.
(5) Trending Attributes:
a number of emails by an IP address,
a number of emails to a target by an IP address,
a number of URLs per email, etc.
(6) URL-centric Attributes:
a number of emails in which a particular URL appears In addition, global aggregates may be used as an attribute. For example, if the overall percentage of malicious emails in all the world goes down by a large amount, e.g., 90%, at a given time, any particular email may be considered less likely to be unwanted by the recipient.

The analyzing module 430 may be configured to track all or some of these attributes to build and dynamically update behavioral patterns and trusted trends which are then used for assessing new emails. According to one or more embodiments, these trusted trends can be generated using various machine learning algorithms such as heuristic methods, artificial intelligence systems, neural networks, or other experience-based (e.g., trainable) techniques for determining general trends, behavioral data, and other characteristics.

Figure 5:
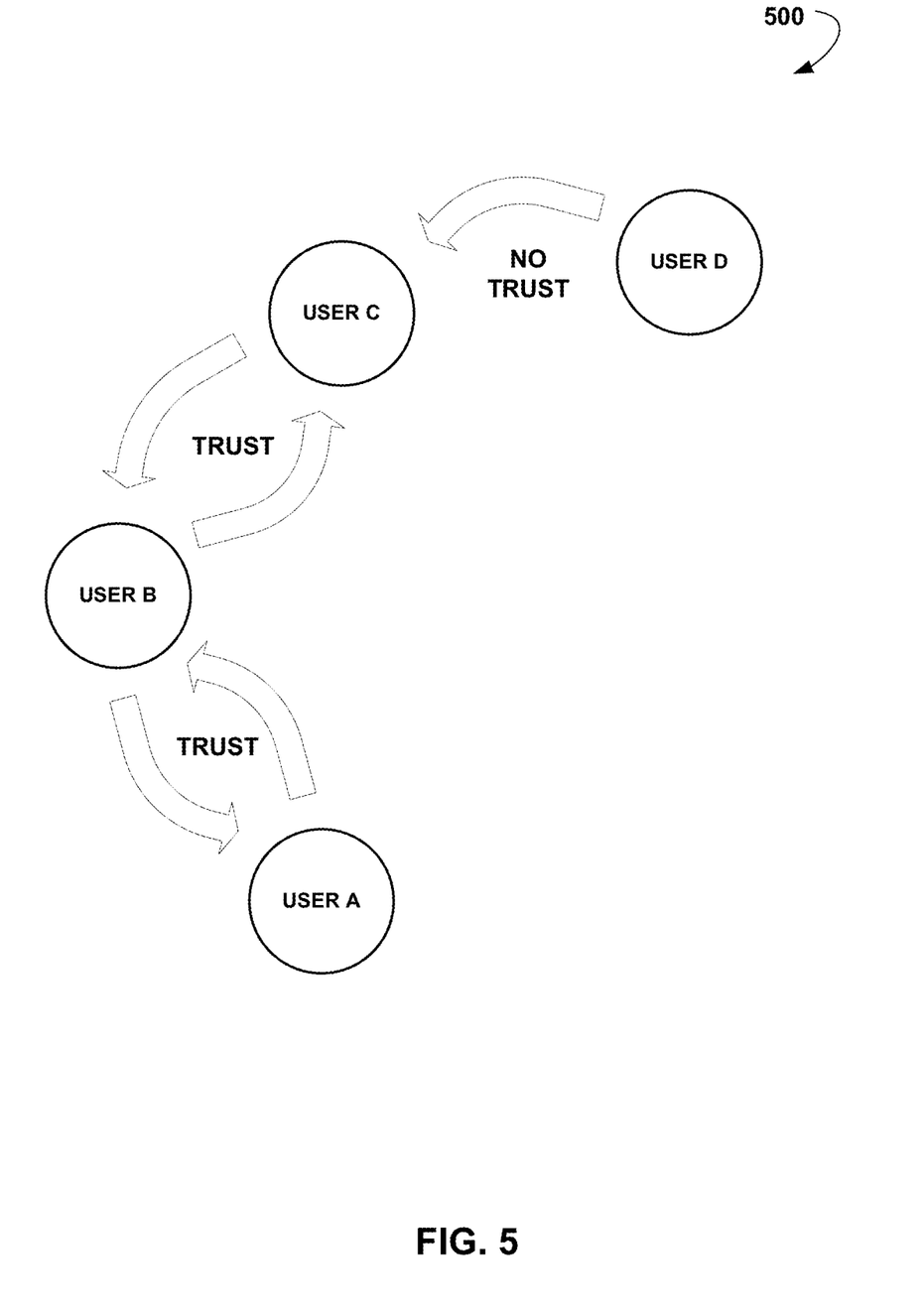
FIG. 5 shows a simplified diagram of trust circles, according to an example embodiment.

According to one or more embodiments, the monitored attributes, trends and behavioral information can be used by the analyzing module 430 to generate virtual "circles of trust". The circles of trust may include information with respect to a particular email user including trusted addressee from which that email user may safely receive emails. Further, this trusted addressee may also consider the email user as a "trusted addressee". In other words, this principle may be expressed as "your friends are my friends". FIG. 5 shows a simplified diagram 500 of such circles of trust. As shown in this figure, there are four email users A, B, C, and D. The user A trusts the user B, and vice versa. The user C trusts the user B, and vice versa. It means that the user C may be considered a trusted addressee for the user A, and vice versa. The user D may have no past relationship with any of these users, and thus it will not be considered a trusted addressee for any of these users. Accordingly, the circles of trust can be generated for email users for which historical email data is aggregated and analyzed. It should be understood that any new emails may be analyzed based on the circles of trust.

According to one or more embodiments, the filter 440 may be configured to assess every new email and determine whether or not the email is an unsolicited email, and if so, block or filter it according to one or more predetermined rules or scenarios. More specifically, the filter 440 may calculate a score with respect to new emails based on determination as to how the new email meets and matches the trusted trends criteria discussed above. In an example, the higher the score, the more probable it is that the received email is an unsolicited email, and vice versa. When the score is above (or below) a predetermined threshold score, the email may be blocked, deleted, marked as "spam," "junk," "unsolicited" email or similarly, placed into a sandbox or quarantined, and so forth. The severity of taken actions may depend on a particular score. For example, if the score is just above a first threshold score, the email may be merely marked as "suspicious" email, however, if the email is above a higher, second threshold, the email may be deleted. Those skilled in the art will appreciate that various filtering techniques may be implemented depending on the current needs, system design and particular application.

In other words, the filter 440 may perform assessment of every new email to determine how "normal" it is. For example, the fact that a particular user within a company or a group of other users from the same company has sent emails to a particular addressee would be considered, by the analyzing module 430, a strong indication that this addressee is likely to be trusted. Thus, when the user of the company or any other user of the same company receives an email from that addressee, such email will be considered, by the filter 440, a "normal" email and it would not be blocked.

In another example, a particular user within a company may receive an email from an addressee, but one or more statements are true: neither this user nor any other user from the same company has sent emails to this addressee or addressee domain, addressee IP has unknown reputation, addressee IP is associated with a suspicious registrar, addressee IP was registered less than 24 hours ago, the source has sent over than five emails in five minutes to users from the same company. If any of these statements are true the filter may classify the new email as an unsolicited email and block it because it is not consistent with the "normal" trends.

The above scenarios are just a few examples of cooperative operation of the analyzing module 430 and the filter 440. In general, as will be appreciated by those skilled in the art, multiple attributes and corresponding trends/behavioral information may be monitored and applied to a new email. For simplicity, it can be said that the analyzing module 430 and the filter 440 are designed to answer the following example questions:

(1) Checking Sending Systems Questions:
Do behavioral patterns match a well-behaving system?
Do behavioral patterns match the stated sending system?
(2) Checking Sending Companies Questions:
Has the recipient sent emails to any address at the sending company?
Has anyone inside of receiving company sent emails to any address at the sending company?
Do behavioral patterns match the stated sending company?
(3) Checking Senders Questions:
Has a particular recipient sent email to a particular sender?
Has anyone inside of receiving company sent emails to the sender?
What percentage of unsolicited emails originates with this sender?
What is the send to response rate for this sender?
(4) Checking Receivers Questions:
What percentage of unsolicited emails does this receiver receive?
What is the send to response rate for this receiver?
Has the recipient sent emails to the sender?
Has the recipient sent emails to the sending company?
(5) Checking Email Questions:
Does it contain features that map to emerging behavioral trends?
Does it contain features that doesn't map to existing behavioral trends?

Figure 6:
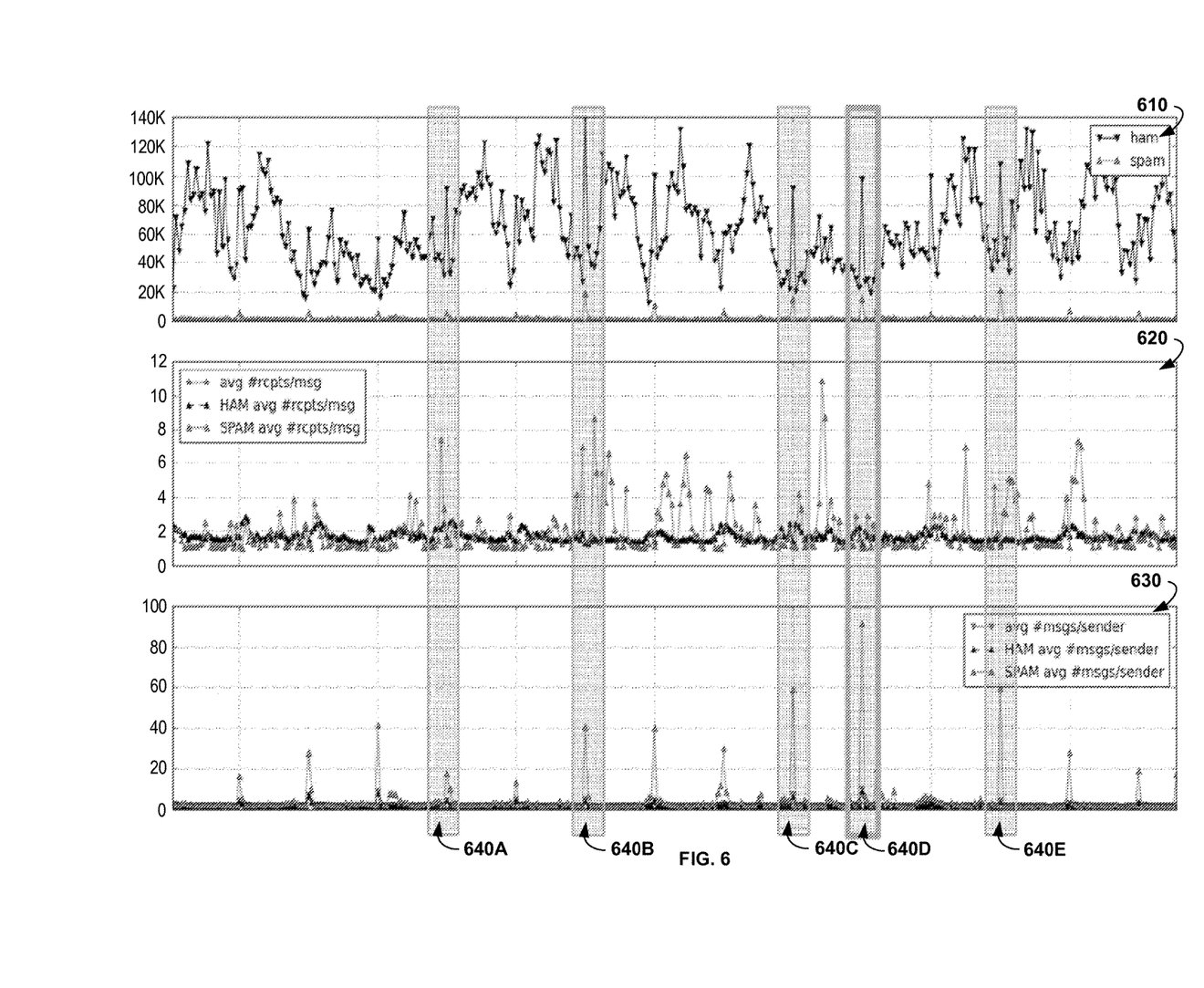
FIG. 6 shows three example charts illustrating various monitored attributes for a particular email user.

To further illustrate the principles of operations of the email filtering system 130, reference is now made to FIG. 6. This figure shows three example charts 610, 620, 630 showing various monitored attributes for a particular email user. In particular, the chart 610 shows dynamics of a number of "ham" or regular emails and a number of "spam" or unsolicited emails received by a particular email user over a period of time. The chart 620 shows dynamics of an average number of recipients per email received by the same user over the same period of time. The chart 630 shows dynamics of an average number of emails per sender. Grey rectangles 640A-640E illustrate various anomalies in the normal behaviors and trends. For example, the first rectangle 640A illustrates that an email having a larger than usual number of recipients was received from a sender and this sender has sent a larger than usual number of emails. At least these abnormal parameters may lead to the determination that the particular email is an unsolicited email. Similarly, other unsolicited emails have been identified and filtered.

Figure 7:
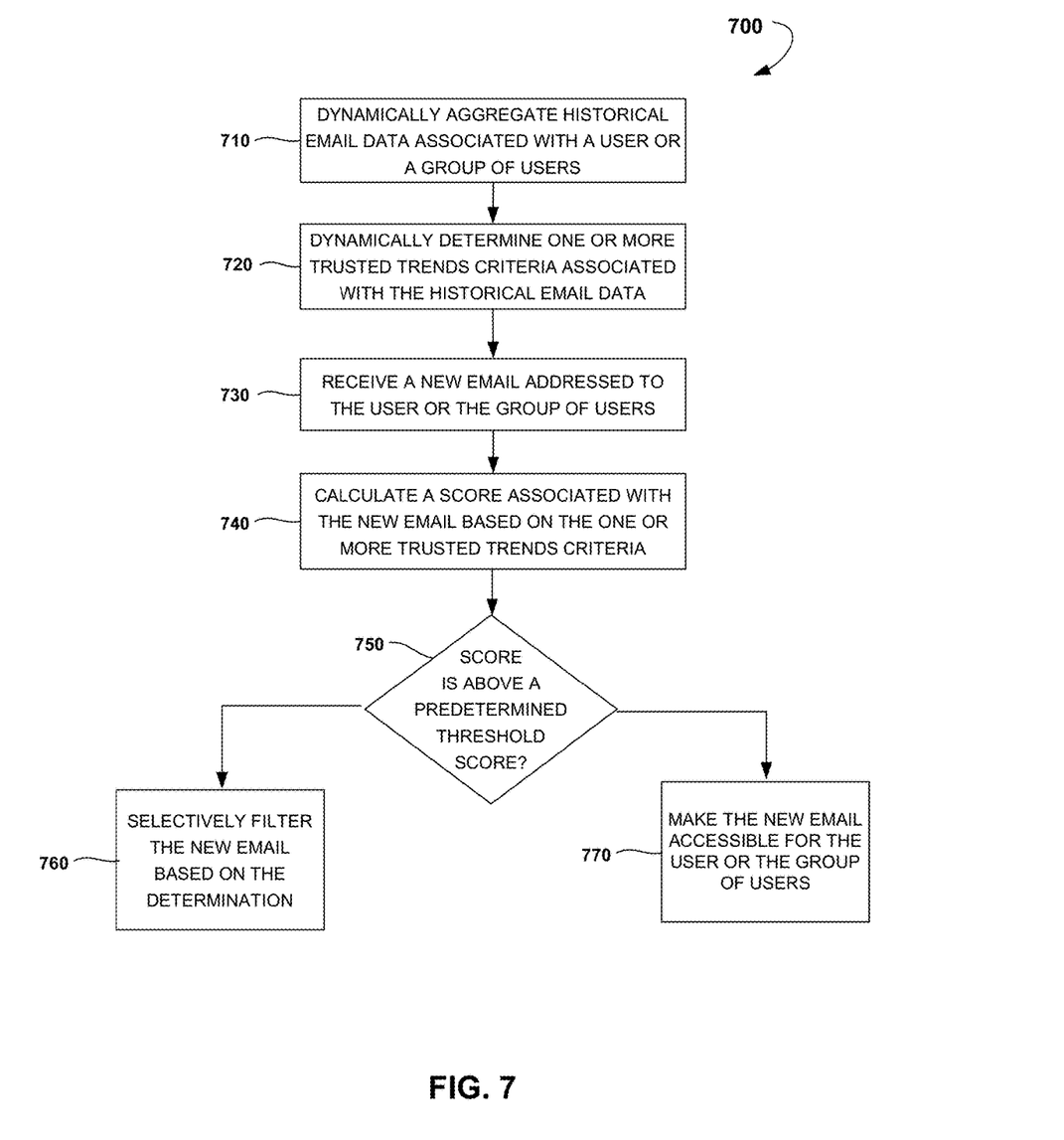
FIG. 7 is a process flow diagram showing a method for filtering unsolicited emails, according to an example embodiment.

FIG. 7 is a process flow diagram showing a method 700 for filtering unsolicited emails according to one or more example embodiments. The method 700 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the email filtering system 130. In other words, the method 700 can be performed by various units discussed above with reference to FIG. 4.

As shown in FIG. 7, the method 700 may commence at operation 710, with the aggregating module 420 dynamically aggregating historical email data, which may include emails associated with a particular user or group of users. The historical email data can be aggregated repeatedly, for example, every time a new email is received or sent by the particular user or a group of users. The historical email data can either relate to entire emails or its parts such as various email parameters or metadata.

At operation 720, the analyzing module 430 may dynamically determine one or more trusted trends criteria associated with the historical email data. The trusted trends criteria may include one or more attributes associated with the historical email data and may relate, generally, to various aspect of the email itself, sender or recipient parameters. The attributes may include user side attributes, infrastructure attributes, company attributes, email attributes, trending attributes, and so forth. Some examples of such attributes may include a number of emails by size, a number of emails by time of day, a number of recipients per email, a number of emails per mail user agent, a number of emails by language, a number of emails by character set, a number of emails by number of attachments, a number of emails by content type, a number of emails having a header and a number of emails lacking a header, a receive to send ratio by address, a number of emails received by address, a number of emails sent to by address, a percentage of unsolicited emails received, and so forth.

The trusted trends criteria, in other words, may constitute behavioral patterns and trends related to "normal" email activity of the given user of group of users. Such behavioral patterns may be further used to assess abnormal activity in email traffic. As has been described above, the behavioral patterns and trends can be generated by various machine learning algorithms including heuristic algorithms, artificial intelligence algorithms, neural network algorithms, and so forth.

At operation 730, the communication module 410 may receive a new email addressed to the user or the group of users or at least one user of the group of users.

At operation 740, the filter 440 may analyze the new email by determining how it meets or matches the "normal" behavioral patterns and trends. In particular, the filter 440 may calculate a score associated with the new email based on the one or more trusted trends criteria determined at the operation 720. The filter 440 may match the new email to the "normal" behavioral patterns and trends and calculate the score based on the "similarity" between the new email attributes and the attributes associated with the determined behavioral patterns and trends.

At operation 750, the filter 440 may determine that the score is above (or below) a predetermined threshold score.

At operation 760, the filter 440, based on the determination, may selectively filter the new email. The filtering may include blocking, deleting, placing the new email into a quarantine zone, redirecting the new email to a sandbox, replacing suspicious URLs with safe URLs, marking the new email as "spam," "junk," "suspicious," "unsolicited" email, and so forth.

Alternatively, at operation 770, based on the determination, by the filter 440, that the score is within predetermined threshold score limits, the new email can be made accessible for the user or the group of users.

The example embodiments described herein can be implemented in an operating environment comprising computer-executable instructions (e.g., software) installed on a computer, in hardware, or in a combination of software and hardware. Alternatively, the executable instructions may be stored onto a non-transitory processor-readable medium. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Java, C, C++, C#, .NET, PHP, Perl, UNIX Shell, Visual Basic or Visual Basic Script, or other compilers, assemblers, interpreters, or other computer languages or platforms.

Figure 8:
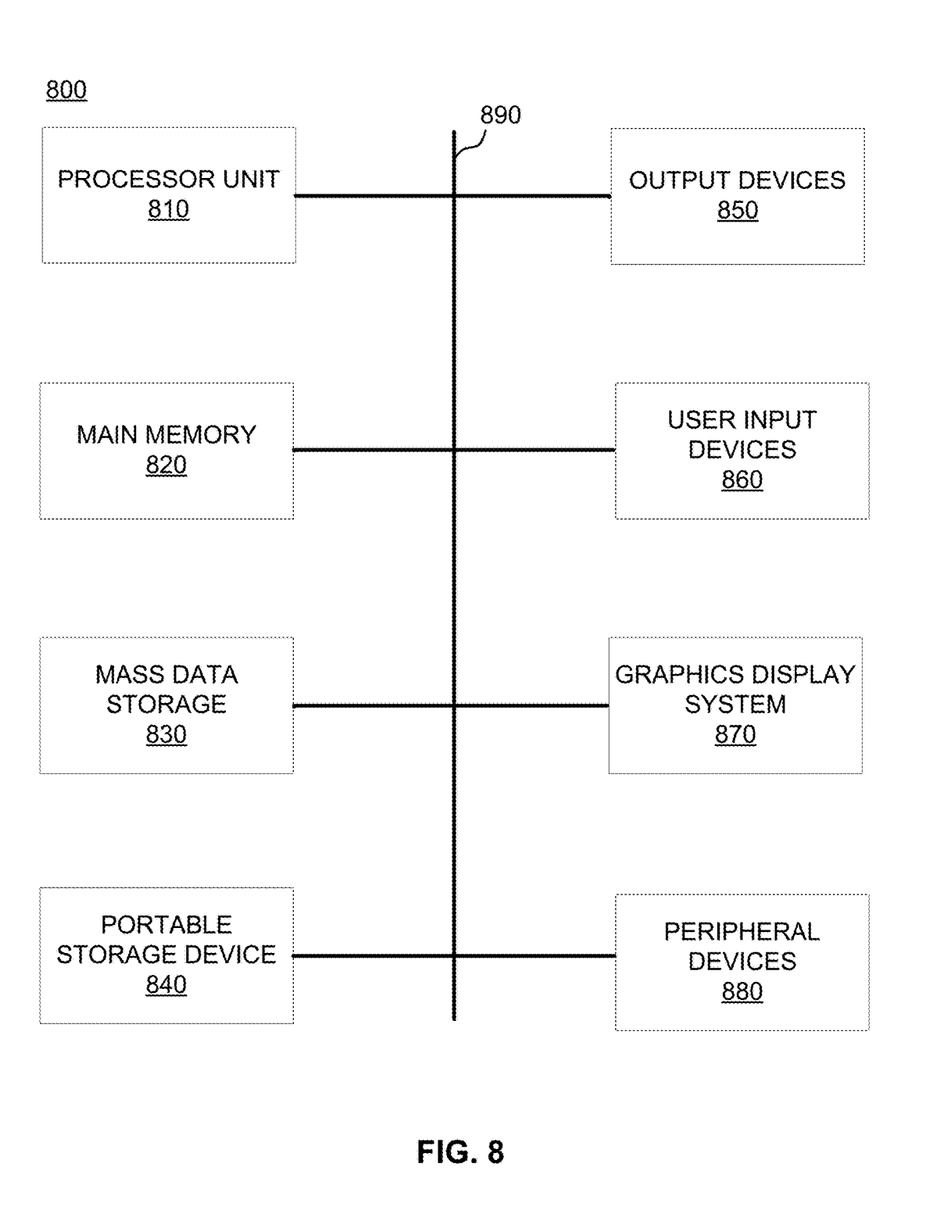
FIG. 8 illustrates an exemplary computing system that may be used to implement embodiments of the present invention.

FIG. 8 illustrates an exemplary computing system 800 that may be used to implement embodiments of the present invention. The system 800 of FIG. 8 may be implemented in the contexts of the likes of computing systems, networks, servers, or combinations thereof. The computing system 800 of FIG. 8 includes one or more processors 810 and main memory 820. Main memory 820 stores, in part, instructions and data for execution by processor 810. Main memory 820 may store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. The components may be connected through one or more data transport means. Processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 may store the system software for implementing embodiments of the present invention for purposes of loading that software into main memory 820.

Portable storage device 840 operates in conjunction with a portable non-volatile storage medium, such as a floppy disk, compact disk, digital video disc, or USB storage device, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include one or more microphones, an alphanumeric keypad, such as a keyboard, for inputting alpha-numeric and other information, or a pointing device, such as a mouse, a trackball, stylus, or cursor direction keys. Input devices 860 may also include a touchscreen. Additionally, the system 800 as shown in FIG. 8 includes output devices 850. Suitable output devices include speakers, printers, network interfaces, and monitors.

Display system 870 may include a liquid crystal display (LCD) or other suitable display device. Display system 870 receives textual and graphical information, and processes the information for output to the display device.

Peripherals 880 may include any type of computer support device to add additional functionality to the computer system. Peripheral device(s) 880 may include a GPS navigation device, telematics device (e.g. OnStar), entertainment device, GSM modem, satellite radio, router, and the like.

The components provided in the computer system 800 of FIG. 8 are those typically found in computer systems that may be suitable for use with embodiments of the present invention and are intended to represent a broad category of such computer components that are well known in the art. Thus, the computer system 800 of FIG. 8 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), Blu-ray Disc (BD), any other optical storage medium, RAM, PROM, EPROM, EEPROM, FLASH memory, and/or any other memory chip, module, or cartridge.

Thus, methods and systems for filtering unsolicited emails have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method of finding abnormalities in otherwise legitimate emails containing Uniform Resource Locators (URLs), the method comprising:
  training, using one or more processors based on dynamically aggregated historical email data received from a service provider directed to a group of clients, one or more machine learning algorithms to determine normal patterns in addressees, URLs, and a number of sending Top-Level Domains of emails received via the Internet by the group of clients;
  generating a network of trusted addressees based on the determined normal patterns, the generating including determining a first client is a trusted addressee of a second client based on: determining, based on the determined normal patterns, the first client is a trusted addressee of a third client, and determining, based on the determined normal patterns, the third client is a trusted addressee of the second client;
  determining, using the one or more processors, whether a received email addressed to the group of clients matches the normal patterns in the addressees, the URLs, and the number of sending Top-Level Domains determined by the one or more machine learning algorithms, the determining based on an addressee, at least one URL, and a sending Top-Level Domain of the received email;
  based on the generated network of trusted addressees and the determining whether the received email addressed to the group of clients matches the normal patterns, replacing the at least one URL with a predetermined safe URL; and
  retraining, based on whether the received email matches the normal patterns in the addressees, the URLs, and the number of sending Top-Level Domains, the one or more machine learning algorithms to dynamically update the normal patterns in the addressees, the URLs, and the number of sending Top-Level Domains and to dynamically update the network of trusted addressees.

2. The method of claim 1, wherein the normal patterns further comprise normal patterns in a number of received emails, addressed to a client of the group of clients, by time of day, and a number of received emails, addressed to the group of clients, by time of day.

3. The method of claim 1, wherein the normal patterns further comprise normal patterns in a receive to send ratio by address.

4. The method of claim 1, wherein the normal patterns further comprise normal patterns in:
  a number of emails by size,
  a number of emails per mail user agent,
  a number of emails by language,
  a number of emails by character set,
  a number of emails by number of attachments,
  a number of emails by content type,
  a number of emails having a header and a number of emails lacking a header, and
  a percentage of unsolicited emails received.

5. The method of claim 1, wherein the normal patterns further comprise normal patterns in a number of Internet Protocol (IP) addresses in an Autonomous System Number (ASN).

6. The method of claim 1, wherein the normal patterns further comprise normal patterns in:
  email volume per Internet Protocol (IP) address,
  a number of domains per an Autonomous System Number (ASN), and
  a number of emails by size.

7. The method of claim 1, wherein the normal patterns further comprise normal patterns in a number of Internet Protocol (IP) addresses in an Autonomous System Number (ASN).

8. The method of claim 1, wherein the normal patterns further comprise normal patterns in a number of emails received per domain.

9. The method of claim 1, wherein the normal patterns further comprise normal patterns in a number of headers per email.

10. The method of claim 1, wherein the normal patterns further comprise normal patterns in:
  a number of emails per language,
  a number of emails by character set,
  a number of emails by country,
  a number of emails by number of attachments, or
  a number of emails by content type.

11. The method of claim 1, wherein the normal patterns further comprise normal patterns in a number of emails to a target by an Internet Protocol (IP) address.

12. The method of claim 1, wherein the normal patterns further comprise normal patterns in a number of URLs per email.

13. The method of claim 1, further comprising marking, based on the generated network of trusted addressees and the determining whether the received email addressed to the group of clients matches the normal patterns, the received email as a suspicious email.

14. The method of claim 1, wherein the one or more machine learning algorithms include heuristic algorithms or neural network algorithms.

15. A system for finding abnormalities in otherwise legitimate emails containing Uniform Resource Locators (URLs), the system comprising:
  a processor; and
  a memory for storing logic, the logic being executed by the processor to execute operations comprising:
    training, using one or more processors based on dynamically aggregated historical email data received from an email service provider directed to a group of clients, one or more machine learning algorithms to determine normal patterns in addressees, URLs, and a number of sending Top-Level Domains of emails received via the Internet by the group of clients;
    generating a network of trusted addressees based on the determined normal patterns, the generating including determining a first client is a trusted addressee of a second client based on: determining, based on the determined normal patterns, the first client is a trusted addressee of a third client, and determining, based on the determined normal patterns, the third client is a trusted addressee of the second client;
    determining, using the one or more processors, whether a received email addressed to the group of clients matches the normal patterns in the addressees, the URLs, and the number of sending Top-Level Domains determined by the one or more machine learning algorithms, the determining based on an addressee, at least one URL, and a sending Top-Level Domain of the received email;

based on the generated network of trusted addressees and the determining whether the received email addressed to the group of clients matches the normal patterns, replacing the at least one URL with a predetermined safe URL; and retraining, based on whether the received email matches the normal patterns in the addressees, the URLs, and the number of sending Top-Level Domains, the one or more machine learning algorithms to dynamically update the normal patterns in the addressees, the URLs, and the number of sending Top-Level Domains and to dynamically update the network of trusted addressees.

16. The system of claim 15, wherein the normal patterns further comprise normal patterns in a number of received emails, addressed to a client of the group of clients, by time of day, and a number of received emails, addressed to the group of clients, by time of day.

17. The system of claim 15, wherein the training includes training, using the one or more processors, the one or more machine learning algorithms to determine normal patterns in content based on the dynamically aggregated historical email data, the historical email data including content of each email received by the group of clients, the determining whether the received email addressed to the group of clients matches the normal patterns is further based on content of the received email.

18. The system of claim 15, wherein the operations further comprise informing the email service provider that the at least one URL was replaced with the predetermined safe URL.

19. The system of claim 15, wherein the one or more machine learning algorithms include heuristic algorithms or neural network algorithms.

20. A method of finding abnormalities in otherwise legitimate emails, the method comprising:

training, using one or more processors, one or more machine learning algorithms to determine normal patterns in addressees and a number of sending Top-Level Domains of a plurality of emails received via the Internet by a group of clients, the group of clients including at least a first, a second, and a third client;

generating a network of trusted addressees based on the determined normal patterns, the generating including determining the first client is a trusted addressee of the second client based on: determining, based on the determined normal patterns, the first client is a trusted addressee of the third client, and determining, based on the determined normal patterns, the third client is a trusted addressee of the second client;

determining, using the one or more processors, whether a received email addressed to a client of the group of clients matches the normal patterns in the addressees and the number of sending Top-Level Domains determined by the one or more machine learning algorithms, the determining based on an addressee and a sending Top-Level Domain of the received email;

based on the network of trusted addressees and the determining whether the received email addressed to the client of the group of clients matches the normal patterns, sandboxing the received email; and retraining, based on whether the received email matches the normal patterns in the addressees and the number of sending Top-Level Domains, the one or more machine learning algorithms to dynamically update the normal patterns in the addressees and the number of sending Top-Level Domains and to dynamically update the network of trusted addressees.

21. The method of claim 20, wherein the normal patterns further comprise normal patterns in:
a number of emails by size,
a number of recipients per email,
a number of emails per mail user agent,
a number of emails by language,
a number of emails by character set,
a number of emails by number of attachments,
a number of emails by content type,
a number of emails having a header and a number of emails lacking a header,
a receive to send ratio by address,
a number of emails received by address,
a number of emails sent by address, and
a percentage of unsolicited emails received.

22. The method of claim 20, wherein the normal patterns further comprise normal patterns in:
a number of Internet Protocol (IP) addresses in an Autonomous System Number (ASN),
email volume per IP address,
a number of domains per the ASN,
a number of emails by size, and
a number of recipients per email.

23. The method of claim 20, wherein the normal patterns further comprise normal patterns in:
a number of IP addresses in an Autonomous System Number (ASN),
a number of sending Top-Level Domains,
a number of emails received per domain, and
a number of emails received by address.

24. The method of claim 20, wherein the normal patterns further comprise normal patterns in:
a number of headers per email,
a number of recipients per email,
a number of emails per language,
a number of emails by character set,
a number of emails by country,
a number of emails by number of attachments, and
a number of emails by content type.

25. The method of claim 20, wherein the normal patterns further comprise normal patterns in:
a number of emails by an IP address,
a number of emails to a target by an IP address, and
a number of Uniform Resource Locators (URLs) per email.

26. The method of claim 20, wherein the training includes training, using the one or more processors, the one or more machine learning algorithms to determine normal patterns in content and metadata of the plurality of emails received via the Internet by the group of clients.

27. The method of claim 26, wherein the determining whether the received email addressed to the client of the group of clients matches the normal patterns is further based on content and metadata of the received email.

28. The method of claim 20, wherein the normal patterns further comprise normal patterns in a number of emails in which a particular URL appears.

29. The method of claim 20, wherein the normal patterns further comprise normal patterns in a number of received emails, addressed to the client of the group of clients, by time of day, and a number of received emails, addressed to the group of clients, by time of day.

* * * * *